US010977653B2

(12) United States Patent
Wiese et al.

(10) Patent No.: US 10,977,653 B2
(45) Date of Patent: Apr. 13, 2021

(54) SYSTEMS AND METHODS FOR CROSS-BORDER ATM FRAUD DETECTION

(71) Applicant: MASTERCARD INTERNATIONAL INCORPORATED, Purchase, NY (US)

(72) Inventors: Joseph Norman Wiese, O'Fallon, MO (US); Christopher Allen Bucher, Manchester, MO (US); Bradley John Knoblauch, Webster Groves, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 309 days.

(21) Appl. No.: 15/843,385

(22) Filed: Dec. 15, 2017

(65) Prior Publication Data
US 2019/0188721 A1    Jun. 20, 2019

(51) Int. Cl.
*G06Q 30/00* (2012.01)
*G06Q 20/40* (2012.01)
*G07F 19/00* (2006.01)
*G06Q 20/10* (2012.01)

(52) U.S. Cl.
CPC ..... *G06Q 20/4016* (2013.01); *G06Q 20/1085* (2013.01); *G07F 19/206* (2013.01)

(58) Field of Classification Search
CPC ....................................... G06Q 40/12
USPC ........ 705/43, 1.1, 30, 52, 37, 44; 364/264.3, 364/264.4
See application file for complete search history.

(56) References Cited

U.S. PATENT DOCUMENTS

| 5,884,289 | A | 3/1999 | Anderson et al. |
| 6,094,643 | A | 7/2000 | Anderson et al. |
| 6,450,407 | B1* | 9/2002 | Freeman ............ G06K 19/0723 235/376 |
| 7,610,216 | B1 | 10/2009 | May et al. |
| 7,668,769 | B2 | 2/2010 | Baker et al. |
| 8,548,904 | B1 | 10/2013 | Bear et al. |
| 8,600,872 | B1 | 12/2013 | Yan |
| 9,652,772 | B1* | 5/2017 | Eyges ................ G06Q 20/4016 |

(Continued)

OTHER PUBLICATIONS

NPL Search History.*
PCT International Search Report and Written Opinion, Application No. PCT/US2018/059325, dated Mar. 11, 2019, 13 pps.

*Primary Examiner* — John H. Holly
(74) *Attorney, Agent, or Firm* — Armstrong Teasdale LLP

(57) ABSTRACT

A macro fraud detection system for detecting macro level fraud of transaction card automated teller machine (ATM) withdrawals includes a memory device for storing data and a processor. The processor is communicatively coupled to the memory device and is programmed to receive first transaction data corresponding to historical financial transactions between a plurality of transaction cards and at least one ATM. The processor is also programmed to aggregate the first transaction data into one or more referential tables, and determine one or more threshold values based on the aggregated first transaction data. In addition, the processor is programmed to receive second transaction data corresponding to current financial transactions between the plurality of transaction cards and the at least one ATM. Moreover, the processor is programmed to compare the second transaction data to the one or more threshold values.

17 Claims, 10 Drawing Sheets

(56) References Cited

U.S. PATENT DOCUMENTS

| | | |
|---|---|---|
| 9,773,227 B2 | 9/2017 | Zoldi et al. |
| 2008/0288382 A1 | 11/2008 | Smith et al. |
| 2010/0169192 A1* | 7/2010 | Zoldi .................... G06Q 40/12 705/30 |
| 2011/0016052 A1 | 1/2011 | Scragg |
| 2011/0055074 A1 | 3/2011 | Chen et al. |
| 2012/0226613 A1* | 9/2012 | Adjaoute ........... G06Q 20/4016 705/44 |
| 2013/0024358 A1 | 1/2013 | Choudhuri et al. |
| 2015/0073981 A1 | 3/2015 | Adjaoute |
| 2016/0364794 A1 | 12/2016 | Chari et al. |
| 2017/0161745 A1 | 6/2017 | Hawkins |

\* cited by examiner

SYSTEMS AND METHODS FOR CROSS-BORDER ATM FRAUD DETECTION

BACKGROUND

The field of the disclosure relates generally to financial transaction systems and methods for automated teller machines (ATMs) and, more particularly, to systems and methods for detecting macro level fraud of transaction card ATM withdrawals in a specific country and for a specific issuer.

A transaction card may include or also be referred to as a payment card, a financial transaction card, a credit card, and an ATM card. A transaction card is issued by a financial institution, such as an issuer bank, that can be used to make financial transactions, such as at an ATM. The ATM provides the cardholder with access to financial transactions with the issuer bank in public spaces without the need for face-to-face interaction with a bank employee, such as a bank teller. Financial transactions include, for example, deposits, cash withdrawals, and obtaining cardholder account information.

The potential for fraudulent transactions using transaction cards, however, is a major concern for financial institutions as well as account holders. Transaction card information and personal information about a cardholder are susceptible to being obtained by theft. For example, fraudsters may infiltrate legitimate corporations and use their employment as a means for acquiring customer and/or transaction card information, and subsequently use the information to commit fraud. For example, one type of fraud, referred to as "skimming," usually occurs when the transaction card information is obtained by a dishonest employee or agent of a legitimate merchant. What typically happens is that the cardholder proffers his or her transaction card at the merchant to make a transaction. The relevant information is electronically and/or physically copied from the transaction card while the skimmer has possession of the transaction card outside of the cardholder's view and the transaction card is subsequently reproduced creating a counterfeit transaction card.

"Macro" level fraud has recently become a growing concern for financial institutions. Macro level fraud typically includes larger scaled attacks, such as, for example, using a large number of compromised transaction cards to execute relatively small fraudulent transactions in an attempt to prevent detection. For example, in the past fraudsters would take a single transaction card and attempt to exploit it for $10,000 or $100,000. However, fraud detection models have been put into place to detect and prevent such large fraudulent transactions. Now, instead of taking one transaction card and attempting to exploit it for a large dollar amount, the fraudsters are taking a large amount of transaction cards and attempting to exploit each for a small dollar amount, attempting to stay below the fraud detection thresholds of current fraud detection models.

Therefore, a fraud detection system is needed which is capable of identifying and preventing macro level fraud activity.

BRIEF DESCRIPTION

In one embodiment, a macro fraud detection system for detecting macro level fraud of transaction card automated teller machine (ATM) withdrawals is provided. The macro fraud detection system includes a memory device for storing data, and a processor communicatively coupled to the memory device and programmed to receive first transaction data corresponding to historical financial transactions between a plurality of transaction cards and at least one ATM. The processor is also programmed to aggregate the first transaction data into one or more referential tables, and determine one or more threshold values based on the aggregated first transaction data. In addition, the processor is programmed to receive second transaction data corresponding to current financial transactions between the plurality of transaction cards and the at least one ATM. The processor is also programmed to compare the second transaction data to the one or more threshold values.

In another embodiment, a computer-based method for detecting macro level fraud of transaction card automated teller machine (ATM) withdrawals is provided. The method includes receiving first transaction data corresponding to historical financial transactions between a plurality of transaction cards and at least one ATM. In addition, the method includes aggregating the first transaction data into one or more referential tables, and determining one or more threshold values based on the aggregated first transaction data. Moreover, the method includes receiving second transaction data corresponding to current financial transactions between the plurality of transaction cards and the at least one ATM. Furthermore, the method includes comparing the second transaction data to the one or more threshold values.

In yet another embodiment, one or more non-transitory computer-readable storage media having computer-executable instructions embodied thereon is provided. When executed by at least one processor, the computer-executable instructions cause the processor to receive first transaction data corresponding to historical financial transactions between a plurality of transaction cards and at least one ATM. In addition, the computer-executable instructions cause the processor to aggregate the first transaction data into one or more referential tables, and determine one or more threshold values based on the aggregated first transaction data. Moreover, the computer-executable instructions cause the processor to receive second transaction data corresponding to current financial transactions between the plurality of transaction cards and the at least one ATM. In addition, the computer-executable instructions cause the processor to compare the second transaction data to the one or more threshold values.

BRIEF DESCRIPTION OF THE DRAWINGS

FIG. 1 is a schematic diagram illustrating an example multi-party automated teller machine (ATM) system having a macro fraud detection module.

FIG. 2 is a simplified block diagram of an example transaction card network system including a plurality of computer devices and the macro fraud detection module shown in FIG. 1.

FIG. 3 illustrates an example configuration of an ATM of FIG. 1 operated by a user shown in FIG. 1 to initiate a transaction using a transaction card.

FIG. 4 illustrates an example configuration of a server system that may be used with the transaction card network system shown in FIG. 2.

FIG. 5 is a component view of an example macro fraud detection module shown in FIG. 1.

FIG. 6 is a graph showing an example series of financial transactions performed by a plurality of transaction cards associated with an issuer shown in FIG. 1.

FIG. 7 is a graph indicating normal transaction activity.

FIG. 8 is a graph of the transaction data shown in Table 4.

FIG. 9 is a block diagram showing a process flow for detecting macro level fraud of transaction card ATM withdrawals in a specific country and for a specific issuer using the macro fraud detection module shown in FIG. 1.

FIG. 10 is flow chart of an example method for detecting macro level fraud of a plurality of transaction cards using a computer device coupled to a memory device, such as the macro fraud detection module shown in FIG. 1.

Like numbers in the Figures indicate the same or functionally similar components.

DETAILED DESCRIPTION

Figure 1:
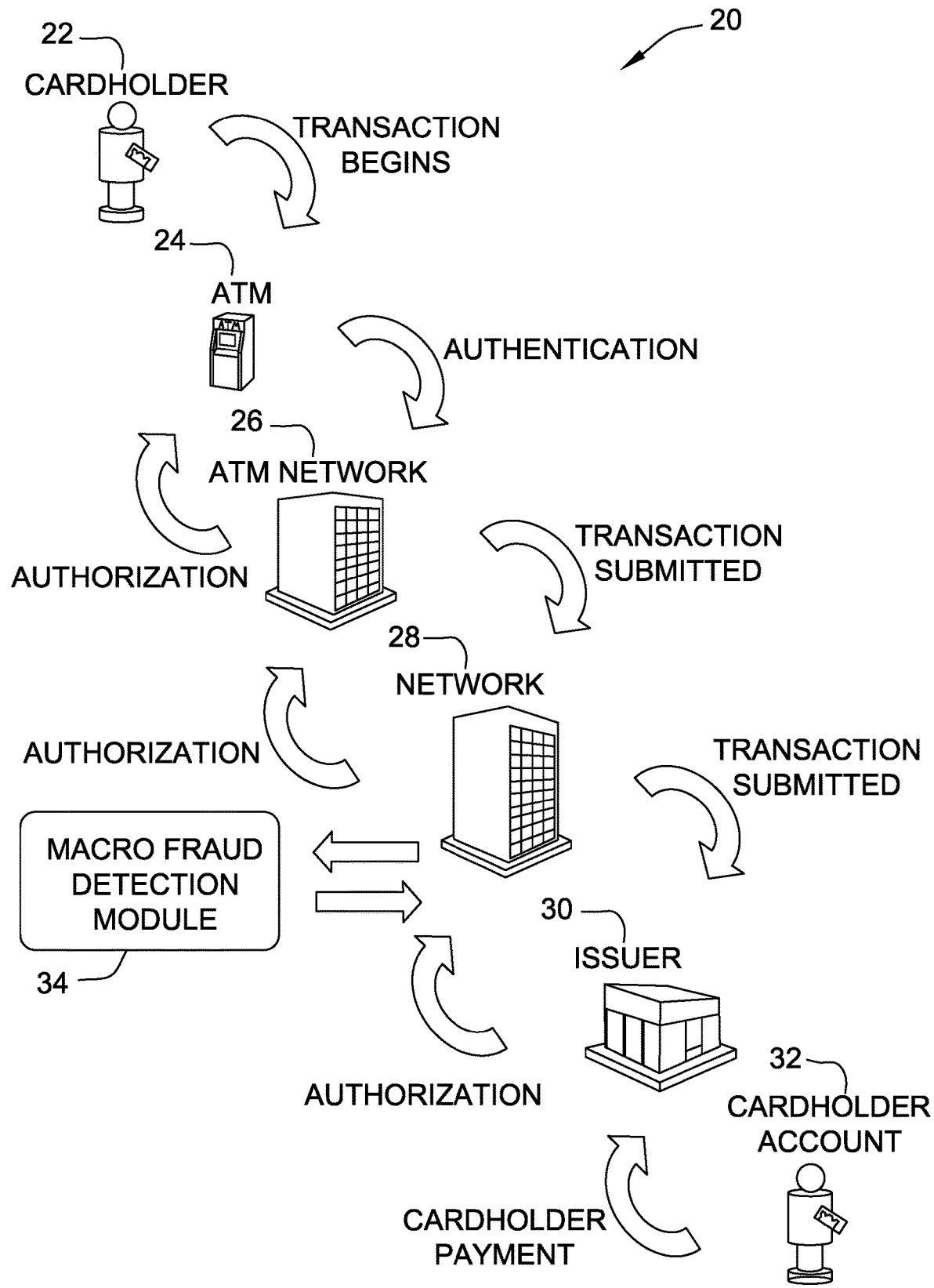
FIGS. 1-10 show exemplary embodiments of the methods and systems described herein.

The following detailed description illustrates embodiments of the disclosed system and methods by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems for detecting out-of-pattern payment card transactions that may be an indication of fraud. More specifically, a specially programmed computer module referred to as a macro fraud detection module is configured to collect transaction data associated with a plurality of transaction cards and selectively use one or more specialized algorithms applied to the transaction data to detect macro level fraud.

In one example embodiment, the macro fraud detection module is configured for use with a transaction card processing network such as, for example, an interchange network. The macro fraud detection module includes a memory device and a processor in communication with the memory device and is programmed to communicate with the interchange network to receive transaction information for a plurality of transactions. The interchange network is configured to process transaction card transactions between cardholders and the issuer banks of the cardholders' transaction cards. The transaction information includes data relating to automated teller machine (ATM) transactions (e.g., cash withdrawals) made by the cardholder. Specifically, the transaction information includes timestamps and location (e.g., country identifiers) for each ATM transaction.

The macro fraud detection module uses the transaction data to identify and track normal or typical transaction behaviors tor trends (e.g., volume, velocity, etc.) for individual issuers in one or more countries. In one example embodiment, the macro fraud detection module generates numeric threshold values associated with the normal maximum approved dollar amount by an issuer within any thirty minute window, based on retrieved historical transaction information. The macro fraud detection module can then collect real-time transaction information and compare the real-time transaction information (e.g., volume, velocity, etc.) with the generated threshold values to detect abnormal activity. After the real-time transaction information exceeds a predetermined threshold value, various tiers of additional analysis, notification, and/or alerting can be implemented. As the abnormal activity becomes more and more suspicious, further actions can be taken, including having the macro fraud detection module decline further transactions initiated be one or more issuers in one or more countries.

The macro fraud detection module uses financial transactions made by a plurality of transaction cards, at a plurality of ATMs in a specific county to generate base and maximum threshold values specific to a particular transaction card issuer. The threshold values are stored within a database. The macro fraud detection module aggregates the transaction data into one or more referential tables, and determines the base and maximum threshold values based on the transaction data. In particular, the macro fraud detection module aggregates the transaction data into the one or more referential tables by at least one of an issuer, the country of transaction, and a transaction channel (e.g., ATM). In some embodiments, the macro fraud detection module sorts the transaction data into thirty minute buckets per date based on a date of the transactions. The macro fraud detection module calculates a total transaction amount for each thirty minute bucket, wherein the total transaction amount within the bucket is referred to as a "velocity" of the respective thirty minute bucket. In other embodiments, the macro fraud detection module may aggregate the transaction data into one or more additional referential tables based on a largest determined velocity for each respective thirty minute bucket. The additional referential tables may be sorted from smallest velocity to largest velocity using only the largest determined velocities for each respective thirty minute bucket. The macro fraud detection module may then determine a percentage difference between consecutive velocities the referential table (i.e., between a previous velocity and a next or current velocity in the table). In some embodiments, the base and maximum threshold values are based on the largest velocity of the transaction data period. The transaction data period can also include, for example, at least a full years' transaction data, a particular months' transaction data, and a maximum velocity for one of the thirty minute buckets.

The macro fraud detection module receives additional transaction data corresponding to current and/or real-time financial transactions between the plurality of transaction cards and the ATMs, and compares the current and/or real-time transaction data to the base and maximum threshold values. In particular, in one embodiment, the macro fraud detection module determines a thirty minute rolling velocity for the additional transaction data. After having the thirty minute rolling velocity, the macro fraud detection module executes a transaction analysis process including a number of "gates." The macro fraud detection module compares the thirty minute rolling velocity to the base threshold value (gate 1). If the thirty minute rolling velocity exceeds the base threshold value, the macro fraud detection module compares the thirty minute rolling velocity to the maximum threshold value (gate 2). If the thirty minute rolling velocity exceeds the maximum threshold value, the macro fraud detection module determines the number of unique primary account numbers (PANs) transacting in the second transaction data. This number is compared to a predetermined threshold value (gate 3). If the number of unique transacting PANs exceeds the threshold value, the macro fraud detection module automatically generates an alert to a technical response team (TRT), and limits the current financial transactions between the plurality of transaction cards and the at least one ATM.

The technical effects of the systems and methods described herein are achieved by performing at least one of the following steps: (a) receiving, by the macro fraud detection module, historical financial transaction data corresponding to a plurality of historical financial transactions between a plurality of transaction cards and a plurality of ATMs; (b) aggregating the historical financial transaction data into one or more referential tables; (c) determining one or more threshold values based on the historical financial transaction data and the determined velocities; (d) receiving, by the macro fraud detection module, current financial transaction data corresponding to a plurality of current financial transactions between a plurality of transaction cards and a plurality of ATMs; and (e) comparing the current financial transaction data to the one or more threshold values.

As used herein, the phrases "transaction card," "financial transaction card," and "payment card" include any suitable card, such as a credit card, a debit card, a prepaid card, a charge card, a membership card, a promotional card, a frequent flyer card, an identification card, a gift card, an ATM card, and/or any other device that may hold payment account information, such as mobile phones, Smartphones, personal digital assistants (PDAs), key fobs, and/or computers. Each type of transaction card can be used as a method of payment for performing a financial transaction.

The term "processor," as used herein, includes any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution mobile devices, clusters, personal computers, workstations, clients, servers, and a processor wherein the memory includes RAM memory, ROM memory, EPROM memory, EEPROM memory, and non-volatile RAM (NVRAM) memory. The above memory types are exemplary only, and are thus not limiting as to the types of memory usable for storage of a computer program.

Furthermore, as used herein, the term "real-time" includes at least one of the times of occurrence of the associated events, the time of collection of data, the time to process the data, and the time of a system response to the events and the environment. In the embodiments described herein as occurring in real-time, these activities and events occur substantially instantaneously.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosed systems and methods have general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party automated teller machine (ATM) system 20 having a macro fraud detection module 34. In the example embodiment, ATM system 20 enables cardholder transactions at an ATM 24, wherein a cardholder 22 does not need to have a face-to-face relationship with a bank employee to execute financial transactions. Macro fraud detection module 34 is a specially programmed computer system that enables transaction data from multi-party ATM system 20 to be used for determining transaction card fraud when a plurality of transaction cards associated with an issuer 30 are used to execute financial transaction (e.g., cash withdrawals from ATMs 24). In some cases, the cardholder 22 is an account holder that initiates transactions processed by ATM system 20. In other cases, anyone with access to the cardholder's transaction card, for example, fraudsters with counterfeit and/or compromised cards or through a web site or smartphone app can be a cardholder. Macro fraud detection module 34 is specially programmed with a plurality of algorithms that are configured to receive various amounts of transaction card data in the form of, for example, historical financial transaction data, merchant data, and inferred data from other sources of information and/or communications. The data is combined and organized into one or more referential tables and is then used to determine total transaction amounts, time of transactions, location of transactions, and various threshold values for an issuer 30 associated with particular transaction cards. Transaction data indicating that one or more of the threshold values are exceeded may be an indication of transaction card fraud.

Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard® is a registered trademark of Mastercard International Incorporated® located in Purchase, N.Y.). As used herein, financial transaction data includes a unique account number associated with an account holder using a transaction card issued by an issuer, purchase data representing a purchase made by the cardholder, including a type of merchant, amount of purchase, date of purchase, and other data, which may be transmitted between any parties of multi-party ATM system 20.

In ATM system 20, a financial institution called the issuer or issuing bank 30 issues a transaction card, such as a credit card or debit card, to cardholder 22, who uses the transaction card to initiate a transaction (e.g., a cash withdrawal) from ATM 24. In some embodiments, ATM 24 is associated with a host bank (not shown). Additionally, in some cases, issuer bank 30 of the cardholder's 22 transaction card is also the host bank of ATM 24. In some cases, issuer bank 30 and the host bank are separate entities. The host bank may monitor and/or service ATM 24 and process transactions initiated at ATM 24. The host bank may alternatively contract with a third party to monitor and/or service ATM 24. In the example embodiment, the host bank of ATM 24 has engaged with an ATM network 26. ATM network 26 monitors ATM 24 and a plurality of other ATMs (not shown) that may be associated with the host bank or another host bank (not shown). When cardholder 22 initiates a transaction, ATM 24 reads transaction card identification information from, for example, a magnetic stripe on the transaction card or a wireless communication device within the transaction card, and communicates electronically with ATM network 26. ATM network 26 is configured to route the transaction to an interchange network 28 to enable authorization of the transaction.

In some embodiments, ATM network 26 is integral to or otherwise associated with interchange network 28. In other embodiments, ATM network 26 is not associated with interchange network 28. Using interchange network 28, the computers of ATM network 26 will communicate with the computers of issuer bank 30 to determine whether the cardholder's account 32 is eligible to complete the transaction (e.g., has available funds). Based on these determinations, the request for authorization will be declined or accepted. If the request for authorization is accepted, an authorization code is issued to ATM 24 via an authorization response message.

For debit card transactions, when a request for a personal identification number (PIN) authorization is approved by issuer bank 30, cardholder's account 32 is decreased by the amount of the transaction. In some cases, there is an additional fee charged to cardholder's account 32 for use of ATM 24. For example, if the transaction card used by cardholder 22 is not affiliated with ATM 24 or the host bank of ATM 24, there may be a small fee charged for the use of ATM 24. In other cases, for example, if the transaction card used by cardholder 22 is associated with either or both of ATM 24 and the host bank of ATM 24, the fee may be waived or refunded to cardholder 22. Normally, a transaction charge associated with the transaction is posted immediately to cardholder's account 32. Interchange network 28 then transmits the approval in the authorization response message to ATM network 26. ATM network 26 transmits the approval to ATM 24. If, for example, the transaction initiated by cardholder 22 was a withdrawal, the authorization response message transmitted to ATM 24 includes instructions for ATM 24 to distribute cash to cardholder 22.

After a transaction is authorized and cleared, the transaction is settled among the host bank and issuer bank 30. Settlement refers to the transfer of financial data or funds among the host bank and issuer bank 30 related to the transaction. Usually, transactions are captured and accumulated into a "batch," which is settled as a group. More specifically, a transaction is typically settled between issuer bank 30 and interchange network 28, and then between interchange network 28 and the host bank.

Figure 2:
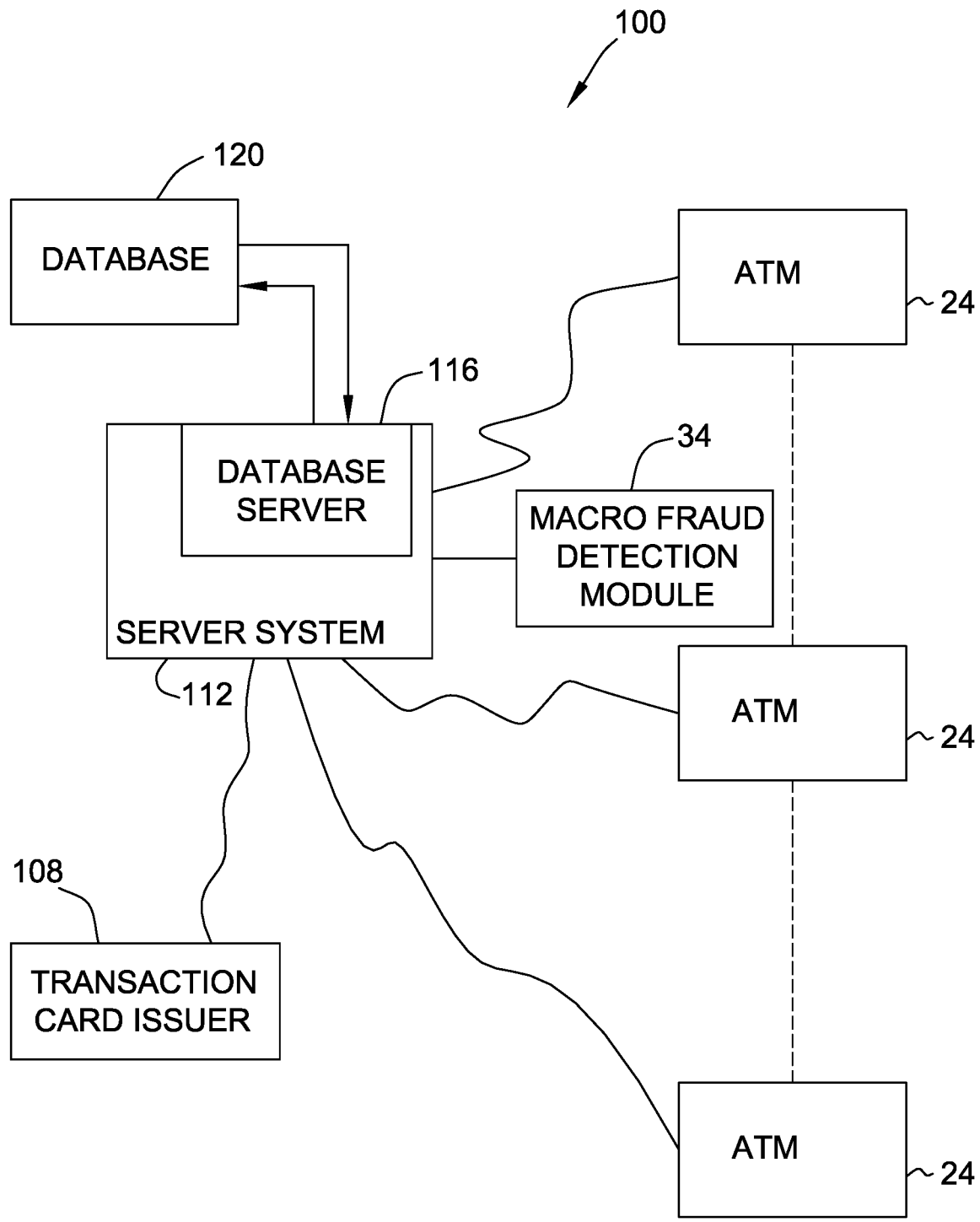

FIG. 2 is a simplified block diagram of an example transaction card network system 100 including a plurality of computer devices and macro fraud detection module 34. In the example embodiment, the plurality of computer devices includes, for example, a server system 112, ATMs 24, and macro fraud detection module 34. In one embodiment, transaction card network system 100 implements a process to detect transaction card fraud at ATMs 24. More specifically, macro fraud detection module 34 is in communication with server system 112 and is configured to receive at least a portion of the financial transaction data relating to financial transactions executed, for example, at ATMs 24 and/or between a plurality of merchants and cardholders or account holders. The financial transaction data includes for example, historical financial transaction data, such as cash withdrawals, and the received financial transaction data is stored in a memory device.

More specifically, in the example embodiment, transaction card network system 100 includes server system 112 and a plurality of ATMs 24 connected to server system 112. Server system 112 is also in communication with a transaction card issuer 108, such as issuer bank 30 (shown in FIG. 1). Server system 112 may be associated with interchange network 28 (shown in FIG. 1) or may be associated with ATM network 26.

In one embodiment, ATMs 24 include networked computers such that server system 112 is accessible to ATMs 24 using the Internet. ATMs 24 are interconnected to the Internet through many interfaces including a network, such as a local area network (LAN) or a wide area network (WAN), dial-in-connections, cable modems, and special high-speed Integrated Services Digital Network (ISDN) lines. ATMs 24 include any computing device capable of interconnecting to the Internet that enables transaction card network system 100 to function as described herein, including any computing device capable of issuing physical money ("cash") therefrom. In addition, ATMs 24 further include hardware and/or software configured to read information from a cardholder's transaction card.

In the example embodiment, each ATM 24 collects transaction data. ATMs 24 may store the transaction data and send the transaction data at a particular time and/or at specific intervals to server system 112. ATMs 24 may send the transaction data to server system 112 in "real-time," and server system 112 may store the transaction data. ATMs 24 communicate the transaction data to server system 112 via a communication link such as, for example, a wired and/or wireless network, a satellite network, radio, 3G, and/or 4G. ATMs 24 may also be configured to send physical attributes associated with at least a location of ATMs 24 to server system 112. In the example embodiment, macro fraud detection module 34 is a component of server system 112 and receives and/or accesses the transaction data from ATMs 24 for processing. In one example, macro fraud detection module 34 receives and processes the transaction data in real-time.

A database server 116 is coupled to a database 120 that contains and stores information on a variety of matters, as described in further detail below. For example, macro fraud detection module 34 and/or server system 112 may store received transaction data and/or ATM physical attributes in database 120. Database 120 may also store operating parameter rules or thresholds used by macro fraud detection module 34. In one example, centralized database 120 is stored on server system 112 and can be selectively accessed by macro fraud detection module 34 and/or by cardholders by logging onto server system 112 through one of ATMs 24. In an alternative embodiment, database 120 is stored remotely from server system 112 and/or macro fraud detection module 34 and may be non-centralized.

Database 120 may include a single database having separated sections or partitions or may include multiple databases, each being separate from each other. Database 120 may store transaction data generated as part of financial activities conducted over the processing network including, for example, data relating to cash withdrawals, account holders, issuers, acquirers, and purchases made. Database 120 may also store account data including at least one of an account holder's name, an account holder's address, a primary account number (PAN) associated with the account holder's name, and other account identifier. Database 120 may also store ATM data including, for example, an ATM identifier that identifies each ATM registered to use the network, host bank information associated with each ATM, and instructions for settling transactions including host bank account information. Database 120 may also store authorization request data associated with a cardholder's transaction data.

In the example embodiment, macro fraud detection module 34 receives transaction data from, for example, ATMs 24 and/or server system 112. Macro fraud detection module 34 may process and/or combine the received transaction data with other data received from additional databases (not shown in FIG. 2). In one example, the additional databases may include, for example, and without limitation, transaction data from: ATMs hosted by another host bank, ATMs associated on another ATM network, and/or known compromised ATMs. Macro fraud detection module 34 may use this additional transaction data to generate updated operating parameter rules. For example, macro fraud detection module 34 may use transaction data from known normal ATMs to define a normal activity range for a transaction card and/or group of transaction cards associated with an issuer. The term "normal activity range" is used herein to refer generally to known or likely normal activity of a transaction card and/or group of transaction cards associated with an issuer and used at ATMs 24, wherein "normal" is used generally to mean "uncompromised."

In the example embodiment, one of ATMs 24 may be associated with a host bank (not shown) while another one of ATMs 24 may be associated with issuer bank 30 (shown in FIG. 1). As described, server system 112 may be associated with interchange network 28. In the example embodiment, server system 112 is associated with a financial transaction processing network, such as interchange network 28, and may be referred to as an interchange computer system. Server system 112 may be used for processing transaction data. In addition, ATMs 24 may include a computer system associated with at least one of an online bank, an acquirer bank, an acquirer processor, an issuer bank associated with a transaction card, and/or an issuer processor. Macro fraud detection module 34 may be associated with interchange network 28 or with an outside third party in a contractual relationship with interchange network 28. Accordingly, each party involved in processing transaction data are associated with a computer system shown in transaction card network system 100 such that the parties can communicate with one another as described herein.

Figure 3:
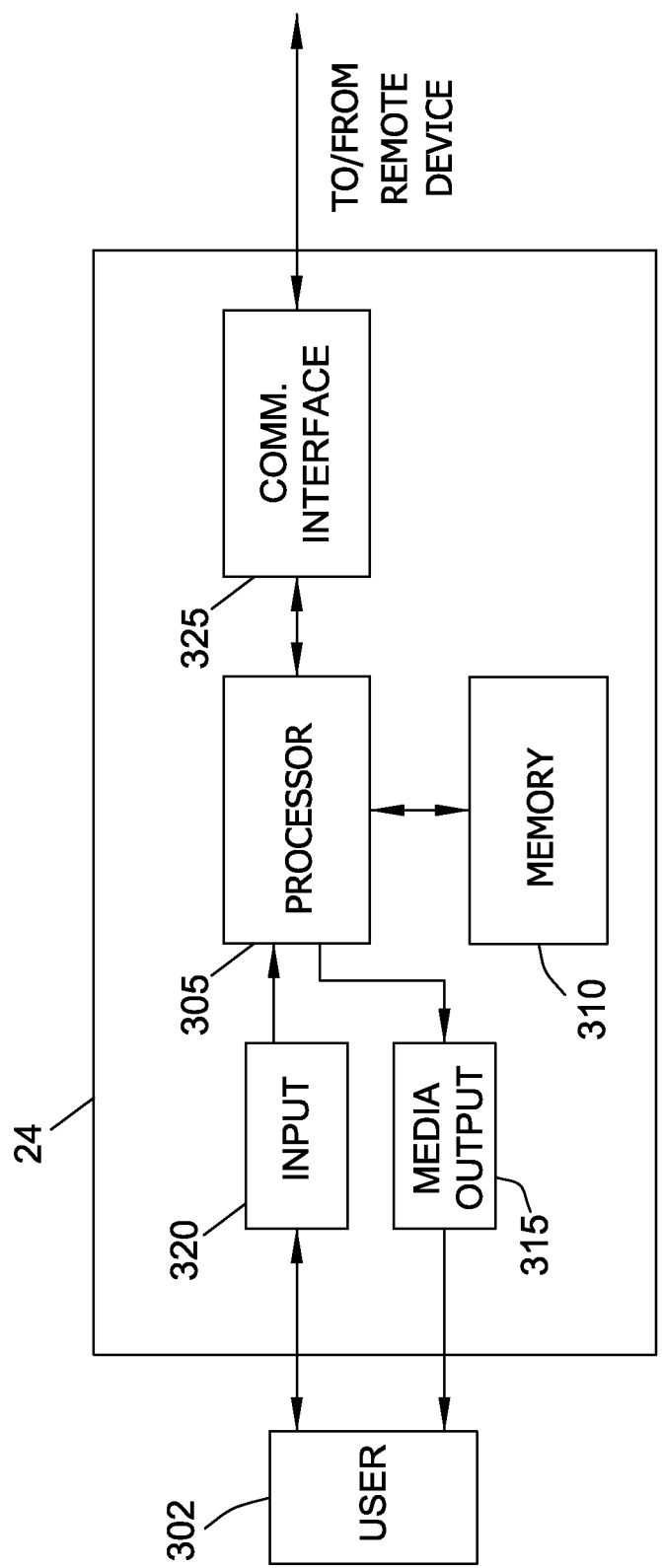

FIG. 3 illustrates an example configuration of ATM 24 (shown in FIG. 2) operated by a user 302, such as cardholder 22 (shown in FIG. 1) for example, to initiate a transaction using a transaction card. In the example embodiment, ATM 24 includes a processor 305 for executing instructions. In some embodiments, executable instructions are stored in a memory 310. Processor 305 may include one or more processing units, for example, a multi-core configuration. Memory 310 is any device allowing information such as executable instructions and/or other data to be stored and retrieved. Memory 310 may include one or more computer readable media. For example, Memory 310 may include, without limitation, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

ATM 24 also includes at least one media output component 315 for presenting information to user 302. Media output component 315 is any component capable of conveying information to user 302. In some embodiments, media output component 315 includes an output adapter such as a video adapter and/or an audio adapter (not shown). An output adapter is operatively coupled to processor 305 and operatively couplable to an output device such as a display device, a liquid crystal display (LCD), organic light emitting diode (OLED) display, or "electronic ink" display, or an audio output device, a speaker or headphones (not shown).

In some embodiments, ATM 24 includes an input device 320 for receiving input from user 302. Input device 320 may include, for example, a keyboard, a pointing device, a mouse, a stylus, a touch sensitive panel, a touch pad, a touch screen, a gyroscope, an accelerometer, a position detector, or an audio input device (not shown). Input device 320 also includes a card reader (not shown) for reading information from a transaction card of user 302. For example, input device 320 may include a magnetic stripe reader, a radio frequency identification (RFID) system, a near-field communication (NFC) system, or any other suitable communication system that allows ATM 24 to read information from the transaction card. A single component such as a touch screen may function as both an output device of media output component 315 and input device 320.

Stored in memory 310 are, for example, computer readable instructions for providing a user interface to user 302 via media output component 315 and, optionally, receiving and processing input from input device 320. A user interface may include, among other possibilities, a web browser and client application. Web browsers enable users, such as user 302, to display and interact with media and other information typically embedded on a web page or a website from server system 112 (shown in FIG. 2). A client application allows user 302 to interact with a server application from server system 112.

ATM 24 may also include a communication interface 325, which is communicatively couplable to a remote device such as server system 112. Communication interface 325 may include, for example, a wired or wireless network adapter or a wireless data transceiver for use with a mobile phone network, Global System for Mobile communications (GSM), 3G, 4G or Bluetooth or other mobile data network or Worldwide Interoperability for Microwave Access (WIMAX).

Figure 4:
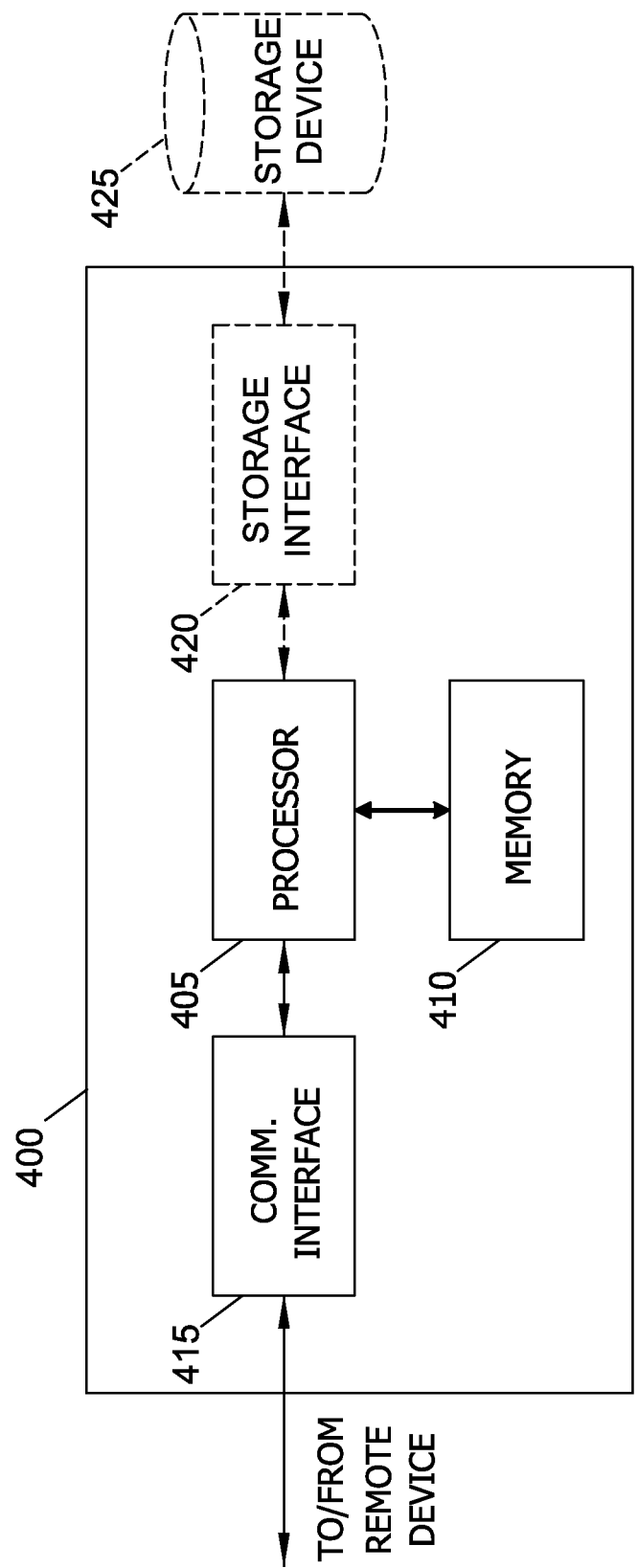

FIG. 4 illustrates an example configuration of a server system 400 that may be used with transaction card network system 100 (shown in FIG. 2). Server system 400 may include, for example, and without limitation, server system 112, macro fraud detection module 34, and database server 116 (each shown in FIG. 2), and any other computing device configured to function as described herein.

In the example embodiment, server system 400 includes a processor 405 for executing instructions. Instructions may be stored in a memory 410, for example. Processor 405 may include one or more processing units (e.g., in a multi-core configuration) for executing instructions. The instructions may be executed within a variety of different operating systems on the server system 400, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Memory 410 may include, for example, and without limitation, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Processor 405 is operatively coupled to a communication interface 415 such that server system 400 is capable of communicating with a remote device such as ATM 24 (shown in FIG. 1) or another server system 400. For example, communication interface 415 may receive requests from user system 114 and/or server system 112 via the Internet. Processor 405 may also be operatively coupled to a storage device 425. Storage device 425 is any computer-operated hardware suitable for storing and/or retrieving data. In some embodiments, storage device 425 is integrated in server system 400. For example, and without limitation, server system 400 may include one or more hard disk drives as storage device 425. In other embodiments, storage device 425 is external to server system 400 and may be accessed by a plurality of server systems 400. For example, and without limitation, storage device 425 may include multiple storage units such as hard disks or solid state disks in a redundant array of inexpensive disks (RAID) configuration. Storage device 425 may include a storage area network (SAN) and/or a network attached storage (NAS) system.

In some embodiments, processor 405 is operatively coupled to storage device 425 via a storage interface 420. Storage interface 420 is any component capable of providing processor 405 with access to storage device 425. Storage interface 420 may include, for example, and without limitation, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Figure 5:
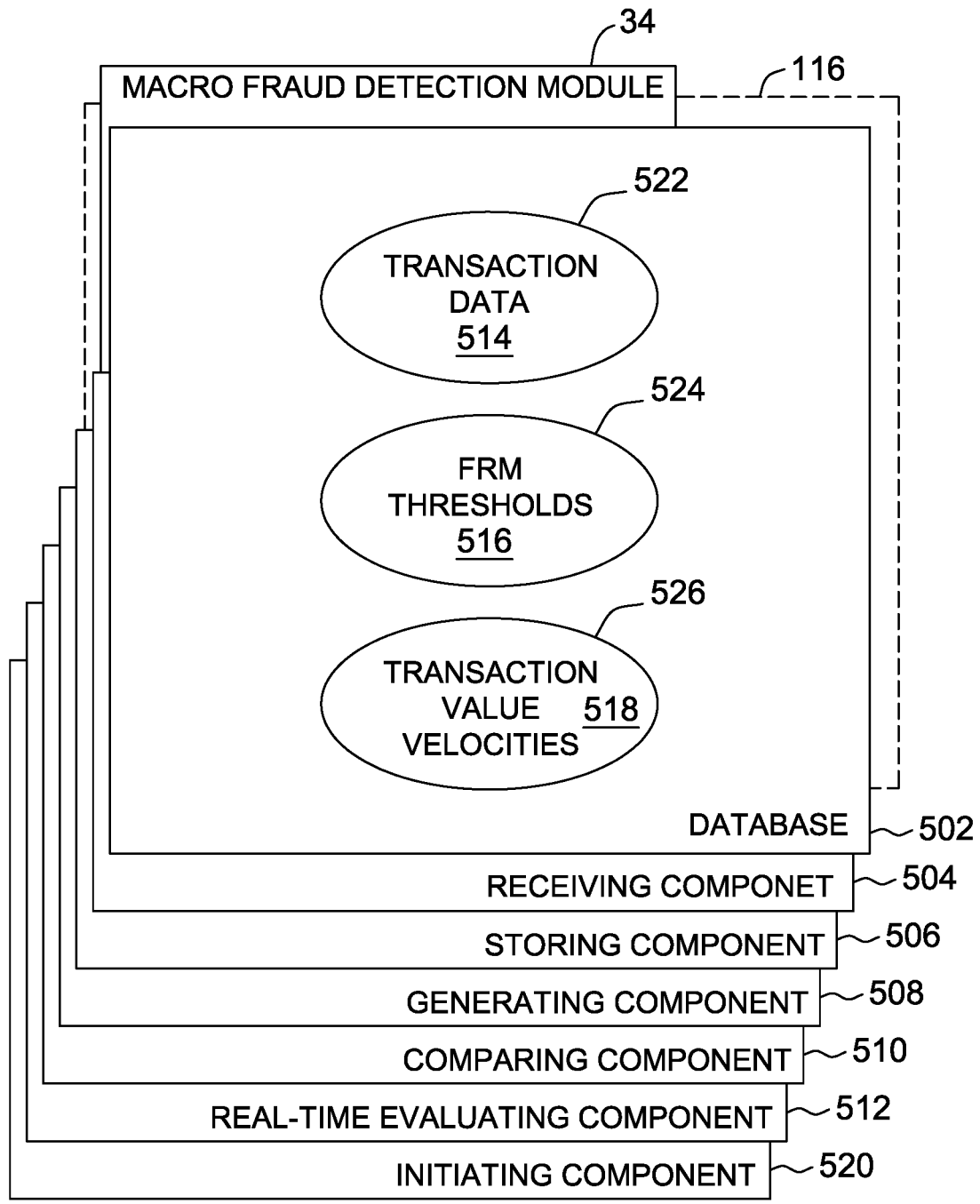

FIG. 5 is a component view of an example macro fraud detection module 34 (shown in FIG. 1). In the example embodiment, macro fraud detection module 34 includes a database 502. In some embodiments, database 502 is a component of database server 116 of server system 112, such as a configuration of database 120 within with other related server components. In the example embodiment, database 502 is coupled to several separate components within macro fraud detection module 34, which perform specific tasks.

Macro fraud detection module 34 includes a receiving component 504 for receiving transaction data 514 from an ATM, for example, ATM 24 (shown in FIG. 1), and/or server system 112, wherein transaction data 514 includes, for example, total transaction amounts, time of the transactions, and a location of the transactions. Receiving component 504 may also receive transaction data from a second ATM (not shown). The second ATM may be associated with a second host bank, where the second host bank may be in communication with a second ATM network.

Macro fraud detection module 34 also includes a storing component 506 for storing the received transaction data 514 in database 502, a generating component 508 for generating and ranking transaction value velocities 518 based on the received transaction data 514, and a comparing component 510 for determining the difference between one or more transaction value velocities 518 after they are generated and ranked by generating component 508. In some embodiments, storing component 506 may also store received and/or generated thresholds for fraud risk management (FRM) 516 and transaction value velocities 518 in database 502. In addition, in some embodiments, macro fraud detection module 34 further includes a real-time evaluating component 512 for evaluating real-time transaction data, which may be included in transaction data 514.

Macro fraud detection module 34 further includes an initiating component 520 for initiating a response based on the transaction value velocities 518. In some embodiments, the response includes, for example, at least an alert for a manual investigation by a technical response team. The technical response team evaluates at least the transaction value velocities 518 to determine whether additional transactions should be declined.

In one example embodiment, database 502 is divided into a plurality of sections, including but not limited to, a transaction data section 522, an FRM thresholds data section 524, and a transaction value velocities data section 526. These sections within database 502 are interconnected to update and retrieve the information described herein as required.

Figure 6:
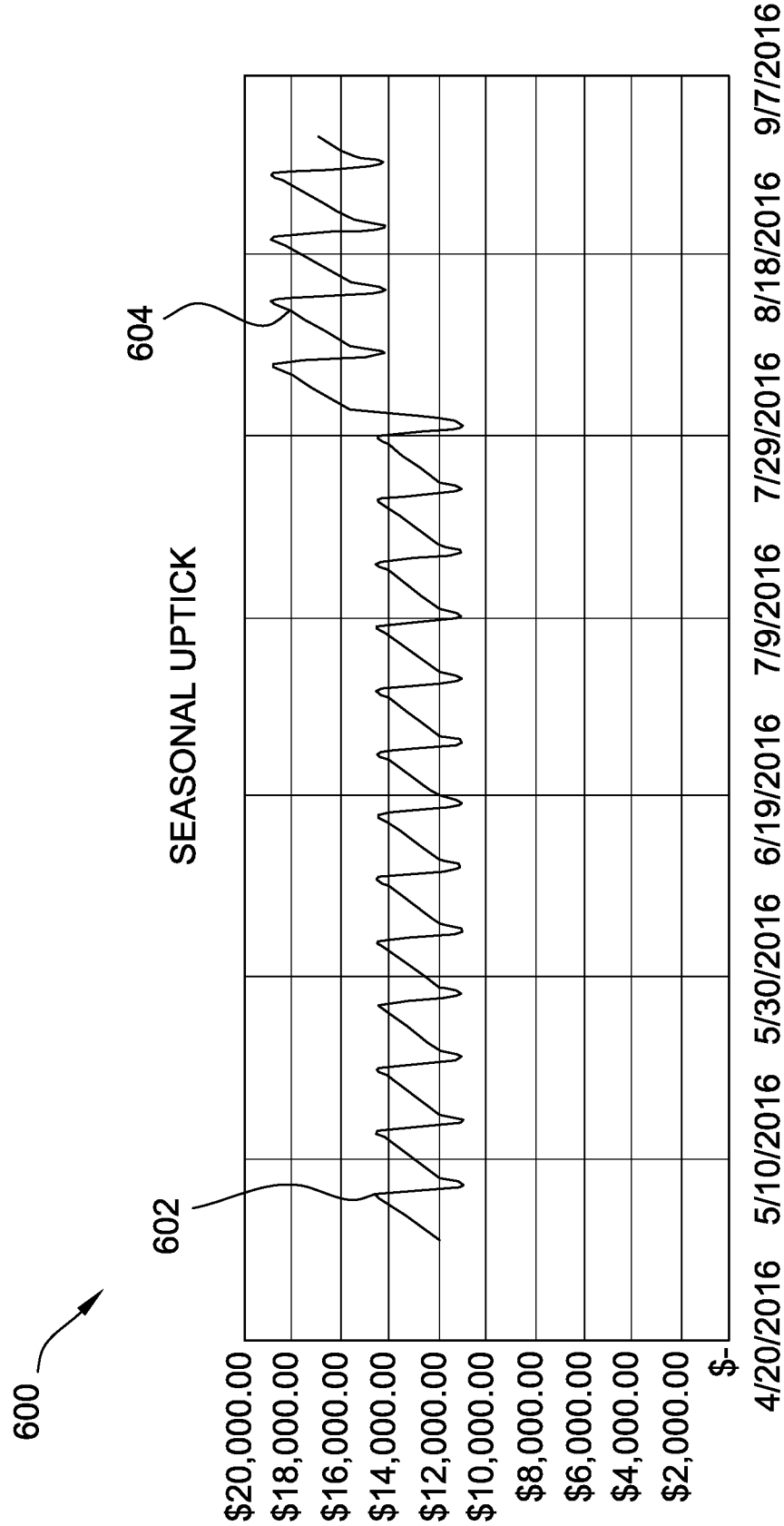

FIG. 6 is a graph 600 showing an example series of financial transactions 602 (e.g., cash withdrawals from ATMs 24 (shown in FIG. 1)) performed by a plurality of transaction cards associated with an issuer, such as issuer 30 (shown in FIG. 1). In the example embodiment, macro fraud detection module 34 is programmed to analyze a plurality of historical financial transactions and generate a set of thresholds that is used to detect macro level fraud, as described herein. The thresholds are generated by performing offline data analytics on the historical financial transactions. The thresholds are applied to a plurality of current and/or real-time transactions grouped by issuer bank, for a specific country, and by transaction channel, for example, ATM withdrawal, point-of-sale device, card-not-present purchase, etc. The goal of the threshold values is to determine what the "normal" maximum approved dollar amount for the plurality of historical transactions was in a thirty minute window. Using the threshold values as a starting point, macro fraud detection module 34 collects current and/or real-time transactions for comparison to the thresholds to detect "abnormal" activity. If the comparison indicates that the current and/or real-time transactions exceed the thresholds, various notification layers can then be implemented. For example, as the "abnormal" activity becomes more suspicious, further actions can be taken, ultimately resulting in having the interchange network 28 decline further transactions.

In the example embodiment, while performing the offline data analytics, macro fraud detection module 34 receives historical transaction data, for example, transaction data 514 (shown in FIG. 5). The input dataset used by macro fraud detection module 34 includes at least the most recent three months of transaction data, plus the upcoming month's transaction data from the previous year. For example, if today is Aug. 1, 2016, transaction data from May 1, 2016 to Jul. 31, 2016, plus transaction data from August 2015 is used by macro fraud detection module 34. The transaction data includes the upcoming month's data from the previous year to facilitate accounting for potential seasonal increases in transactions. For example, cardholders may travel for vacations in August, where they may spend more, e.g., about 30% more that month. The upcoming month's data from the previous year enables the base threshold values during travel season, for example, to be increased. The thresholds are subsequently decreased to normal levels afterward the travel season has passed. The seasonal uptick in spending is illustrated in FIG. 6 by portion 604 of the series of financial transactions 602. By including the upcoming month's data from the previous year, total exposure to the issuer bank is reduced throughout the year. Additional data may be appended to the initial input dataset as it accrues, for example, until there is at least a years' worth of data.

In an alternative embodiment, the input dataset used by macro fraud detection module 34 includes at least a complete year's worth of transaction data. Including a complete year's worth of transaction data facilitates accounting for any seasonal increases in transactions during a year. Additional data may be appended to the initial input dataset as it accrues. The additional data facilitates improving the accuracy of the fraud detection model and may also facilitate accounting for the growth and/or decline of the number of active transaction cards associated with the issuer.

The transaction data is received by macro fraud detection module 34, for example, from server system 112 (shown in FIG. 2) and/or ATM 24 (shown in FIG. 1). The received transaction data is grouped into one or more referential tables, for example, exemplary Table 1, where each transaction is labeled with one or more attributes. For example, the transaction data may be labeled by primary account number (PAN), issuer (ID), "country," "channel," "date/time," "bucket," "amount," etc. In the example embodiment, "country" includes a country code identifying the country where the transaction occurred. "Channel" includes the transaction channel where the transaction occurred, such as, ATM, point-of-sale device (POS), card-not-present (CNP) purchase, etc. "Bucket" includes a thirty minute window, based for example, on a standard 24 hour clock.

TABLE 1

| PAN | ID | COUNTRY | CHANNEL | DATE/TIME | BUCKET | AMOUNT |
|---|---|---|---|---|---|---|
| xx3109 | 613 | 036 | ATM | 6/24/2016 0:45 | 6/24/2016 0:30 | $ 302.50 |
| xx8102 | 613 | 036 | ATM | 6/29/2016 0:47 | 6/29/2016 0:30 | $ 38.91 |
| xx0104 | 613 | 036 | ATM | 6/29/2016 2:16 | 6/29/2016 2:00 | $ 149.04 |
| xx3101 | 613 | 036 | ATM | 6/30/2016 23:05 | 6/30/2016 23:00 | $ 238.12 |
| xx1104 | 613 | 036 | ATM | 6/30/2016 23:45 | 6/30/2016 23:30 | $ 223.37 |
| xx1104 | 613 | 036 | ATM | 6/30/2016 23:43 | 6/30/2016 23:30 | $ 370.81 |
| xx1104 | 613 | 036 | ATM | 6/30/2016 23:44 | 6/30/2016 23:30 | $ 370.81 |
| xx3101 | 613 | 036 | ATM | 6/30/2016 23:06 | 6/30/2016 23:00 | $ 223.37 |
| xx1104 | 613 | 036 | ATM | 6/30/2016 23:42 | 6/30/2016 23:30 | $ 370.81 |
| xx1104 | 613 | 036 | ATM | 6/30/2016 23:46 | 6/30/2016 23:30 | $ 149.65 |
| xx3101 | 613 | 036 | ATM | 6/30/2016 23:05 | 6/30/2016 23:00 | $ 238.12 |
| xx0104 | 613 | 036 | ATM | 6/25/2016 1:19 | 6/25/2016 1:00 | $ 75.77 |
| xx5108 | 613 | 036 | ATM | 6/25/2016 3:34 | 6/25/2016 3:30 | $ 259.67 |
| xx8109 | 613 | 036 | ATM | 6/25/2016 23:42 | 6/25/2016 23:30 | $ 370.01 |
| xx1100 | 613 | 036 | ATM | 7/1/2016 1:25 | 7/1/2016 1:00 | $ 148.91 |
| xx0104 | 613 | 036 | ATM | 7/1/2016 3:56 | 7/1/2016 3:30 | $ 39.07 |
| xx5101 | 613 | 036 | ATM | 7/1/2016 8:01 | 7/1/2016 8:00 | $42,332.03 |
| xx5101 | 613 | 036 | ATM | 7/1/2016 8:01 | 7/1/2016 8:00 | $42,332.03 |
| xx5101 | 613 | 036 | ATM | 7/1/2016 8:04 | 7/1/2016 8:00 | $ 75.93 |
| xx5101 | 613 | 036 | ATM | 7/1/2016 8:03 | 7/1/2016 8:00 | $42,332.03 |
| xx5101 | 613 | 036 | ATM | 7/1/2016 9:29 | 7/1/2016 9:00 | $ 91.78 |
| xx5101 | 613 | 036 | ATM | 7/1/2016 8:03 | 7/1/2016 8:00 | $16,932.81 |
| xx0104 | 613 | 036 | ATM | 7/1/2016 3:55 | 7/1/2016 3:30 | $ 39.07 |
| xx5101 | 613 | 036 | ATM | 7/1/2016 8:07 | 7/1/2016 8:00 | $ 8,466.41 |
| xx5101 | 613 | 036 | ATM | 7/1/2016 8:00 | 7/1/2016 8:00 | $84,664.06 |
| xx5101 | 613 | 036 | ATM | 7/1/2016 7:58 | 7/1/2016 7:30 | $42,332.03 |
| xx5101 | 613 | 036 | ATM | 7/1/2016 9:28 | 7/1/2016 9:00 | $ 187.62 |

Macro fraud detection module 34 sorts the data by date and time, and calculates the total transaction amount for each thirty minute window, i.e., bucket, as illustrated in Table 2. This thirty minute window total is referred to as a "velocity" associated with the transactions during the particular bucket period.

TABLE 2

| PAN | ID | COUNTRY | CHANNEL | DATE/TIME | BUCKET | AMOUNT | VELOCITY |
|---|---|---|---|---|---|---|---|
| xx3109 | 613 | 036 | ATM | 6/24/2016 0:45 | 6/24/2016 0:30 | $302.50 | $302.50 |
| xx8102 | 613 | 036 | ATM | 6/25/2016 1:19 | 6/25/2016 1:00 | $ 75.77 | $ 75.77 |
| xx0104 | 613 | 036 | ATM | 6/25/2016 3:34 | 6/25/2016 3:30 | $259.67 | $259.67 |
| xx3101 | 613 | 036 | ATM | 6/25/2016 23:42 | 6/25/2016 23:30 | $370.01 | $370.01 |
| xx1104 | 613 | 036 | ATM | 6/29/2016 0:47 | 6/29/2016 0:30 | $ 38.91 | $ 38.91 |
| xx1104 | 613 | 036 | ATM | 6/29/2016 2:16 | 6/29/2016 2:00 | $149.04 | $149.04 |
| xx1104 | 613 | 036 | ATM | 6/30/2016 23:05 | 6/30/2016 23:00 | $238.12 | $238.12 |
| xx3101 | 613 | 036 | ATM | 6/30/2016 23:05 | 6/30/2016 23:00 | $238.12 | $476.24 |
| xx1104 | 613 | 036 | ATM | 6/30/2016 23:06 | 6/30/2016 23:00 | $223.37 | $699.61 |
| xx1104 | 613 | 036 | ATM | 6/30/2016 23:42 | 6/30/2016 23:30 | $370.81 | $370.81 |

TABLE 2-continued

| PAN | ID | COUNTRY | CHANNEL | DATE/TIME | BUCKET | AMOUNT | VELOCITY |
|---|---|---|---|---|---|---|---|
| xx3101 | 613 | 036 | ATM | 6/30/2016 23:43 | 6/30/2016 23:30 | $ 370.81 | $ 741.62 |
| xx0104 | 613 | 036 | ATM | 6/30/2016 23:44 | 6/30/2016 23:30 | $ 370.81 | $ 1,112.43 |
| xx5108 | 613 | 036 | ATM | 6/30/2016 23:45 | 6/30/2016 23:30 | $ 223.37 | $ 1,335.80 |
| xx8109 | 613 | 036 | ATM | 6/30/2016 23:46 | 6/30/2016 23:30 | $ 149.65 | $ 1,485.45 |
| xx1100 | 613 | 036 | ATM | 7/1/2016 1:25 | 7/1/2016 1:00 | $ 148.91 | $ 148.91 |
| xx0104 | 613 | 036 | ATM | 7/1/2016 3:55 | 7/1/2016 3:30 | $ 39.07 | $ 39.07 |
| xx5101 | 613 | 036 | ATM | 7/1/2016 3:56 | 7/1/2016 3:30 | $ 39.07 | $ 78.14 |
| xx5101 | 613 | 036 | ATM | 7/1/2016 7:58 | 7/1/2016 7:30 | $42,332.03 | $ 42,332.03 |
| xx5101 | 613 | 036 | ATM | 7/1/2016 8:00 | 7/1/2016 8:00 | $84,664.06 | $126,996.09 |
| xx5101 | 613 | 036 | ATM | 7/1/2016 8:01 | 7/1/2016 8:00 | $42,332.03 | $169,328.12 |
| xx5101 | 613 | 036 | ATM | 7/1/2016 8:01 | 7/1/2016 8:00 | $42,332.03 | $211,660.15 |
| xx5101 | 613 | 036 | ATM | 7/1/2016 8:03 | 7/1/2016 8:00 | $42,332.03 | $253,992.18 |
| xx0104 | 613 | 036 | ATM | 7/1/2016 8:03 | 7/1/2016 8:00 | $16,932.81 | $270,924.99 |
| xx5101 | 613 | 036 | ATM | 7/1/2016 8:04 | 7/1/2016 8:00 | $ 75.93 | $271,000.92 |
| xx5101 | 613 | 036 | ATM | 7/1/2016 8:07 | 7/1/2016 8:00 | $ 8,466.41 | $279,467.33 |
| xx5101 | 613 | 036 | ATM | 7/1/2016 9:28 | 7/1/2016 9:00 | $ 187.62 | $ 187.62 |
| xx5101 | 613 | 036 | ATM | 7/1/2016 9:29 | 7/1/2016 9:00 | $ 91.78 | $ 279.40 |

After calculating the velocities of the transaction data for each bucket period, macro fraud detection module 34 determines a maximum velocity for each bucket period. Determining the maximum velocity for each bucket period facilitates greater accuracy during the data analytic processing done at the bucket level. In addition, macro fraud detection module 34 determines the number of unique primary account numbers (PANs) in each bucket. The number of unique PANs may be used to facilitate enhancing the fraud risk management (FRM) rules, as described later herein. In the example embodiment, macro fraud detection module 34 generates a second referential table, for example, Table 3, and inputs the transaction data for a particular bucket having the largest determined velocity. The data is ranked by velocity, from smallest to largest.

TABLE 3

| BUCKET | ID | COUNTRY | CHANNEL | UNIQ_PAN | VELOCITY |
|---|---|---|---|---|---|
| Jun. 29, 2016 0:30 | 613 | 036 | ATM | 1 | $ 38.91 |
| Jun. 25, 2016 1:00 | 613 | 036 | ATM | 1 | $ 75.77 |
| Jul. 1, 2016 3:30 | 613 | 036 | ATM | 1 | $ 78.14 |
| Jul. 1, 2016 1:00 | 613 | 036 | ATM | 1 | $148.91 |
| Jun. 29, 2016 2:00 | 613 | 036 | ATM | 1 | $149.04 |

TABLE 3-continued

| BUCKET | ID | COUNTRY | CHANNEL | UNIQ_PAN | VELOCITY |
|---|---|---|---|---|---|
| Jun. 25, 2016 3:30 | 613 | 036 | ATM | 1 | $ 259.67 |
| Jul. 1, 2016 9:00 | 613 | 036 | ATM | 1 | $ 279.40 |
| Jun. 24, 2016 0:30 | 613 | 036 | ATM | 1 | $ 302.50 |
| Jun. 25, 2016 23:30 | 613 | 036 | ATM | 1 | $ 370.01 |
| Jun. 30, 2016 23:00 | 613 | 036 | ATM | 1 | $ 699.61 |
| Jun. 30, 2016 23:30 | 613 | 036 | ATM | 1 | $ 1,485.45 |
| Jul. 1, 2016 7:30 | 613 | 036 | ATM | 1 | $ 42,332.03 |
| Jul. 1, 2016 8:00 | 613 | 036 | ATM | 1 | $279,467.33 |

Macro fraud detection module 34 determines a percentage difference between consecutive or adjacent buckets of the ranked maximum velocities. Table 4 illustrates the second referential table with the calculated percentage differences. During normal transaction activity for a particular issuer, once the bucket periods are ordered, the percentage differences should indicate a gradual increase in the approved transaction amounts between the current and previous approved amounts.

TABLE 4

| BUCKET | ID | COUNTRY | CHANNEL | UNIQ_PAN | VELOCITY | % DIFF |
|---|---|---|---|---|---|---|
| 6/29/2016 0:30 | 613 | 036 | ATM | 1 | $ 38.91 | |
| 6/25/2016 1:00 | 613 | 036 | ATM | 1 | $ 75.77 | 95% |
| 7/1/2016 3:30 | 613 | 036 | ATM | 1 | $ 78.14 | 3% |
| 7/1/2016 1:00 | 613 | 036 | ATM | 1 | $ 148.91 | 91% |
| 6/29/2016 2:00 | 613 | 036 | ATM | 1 | $ 149.04 | 0% |
| 6/25/2016 3:30 | 613 | 036 | ATM | 1 | $ 259.67 | 74% |
| 7/1/2016 9:00 | 613 | 036 | ATM | 1 | $ 279.40 | 8% |
| 6/24/2016 0:30 | 613 | 036 | ATM | 1 | $ 302.50 | 8% |
| 6/25/2016 23:30 | 613 | 036 | ATM | 1 | $ 370.01 | 22% |
| 6/30/2016 23:00 | 613 | 036 | ATM | 1 | $ 699.61 | 89% |
| 6/30/2016 23:30 | 613 | 036 | ATM | 1 | $ 1,485.45 | 112% |
| 7/1/2016 7:30 | 613 | 036 | ATM | 1 | $ 42,332.03 | 2750% |
| 7/1/2016 8:00 | 613 | 036 | ATM | 1 | $279,467.33 | 560% |

Figure 7:
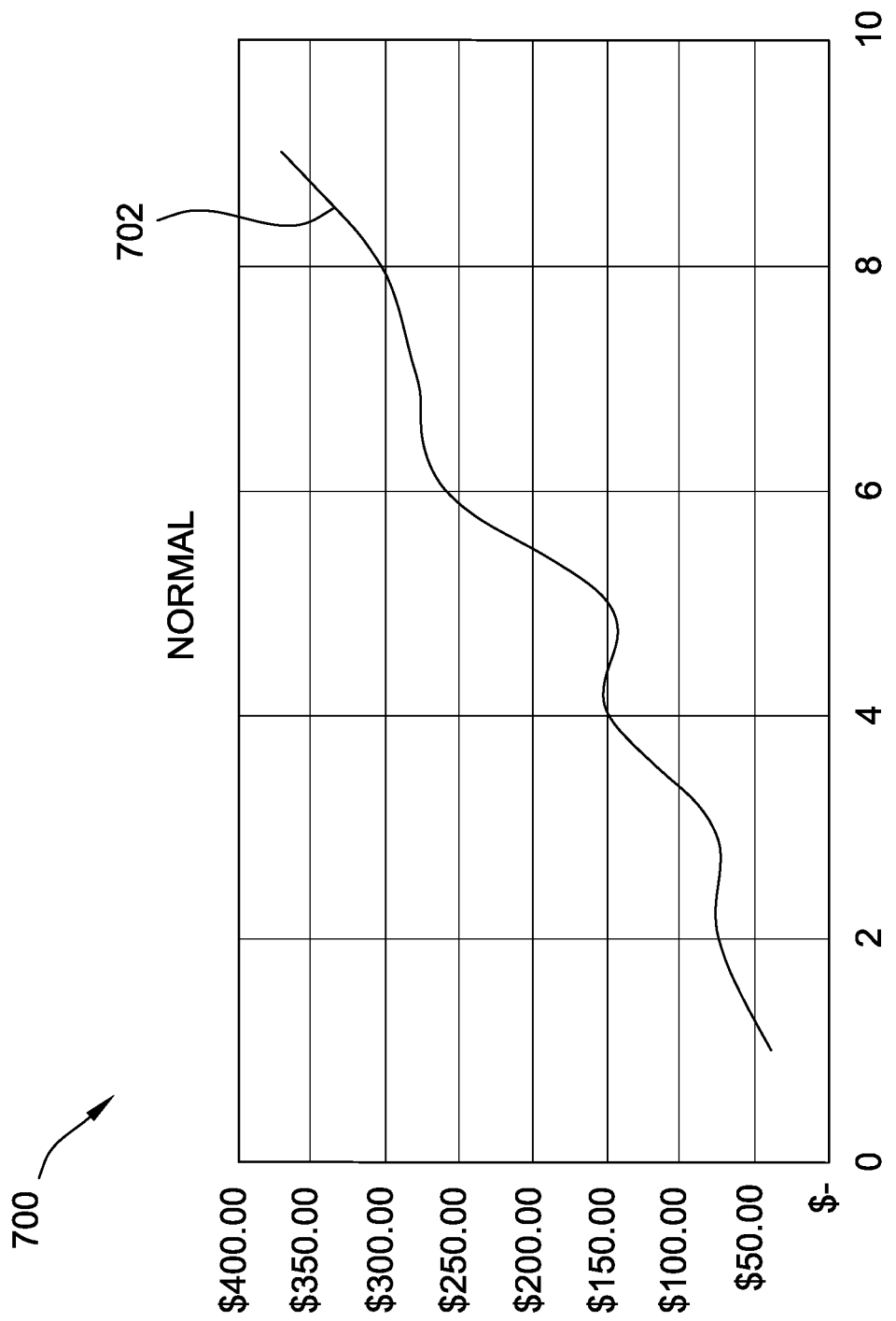
Figure 8:
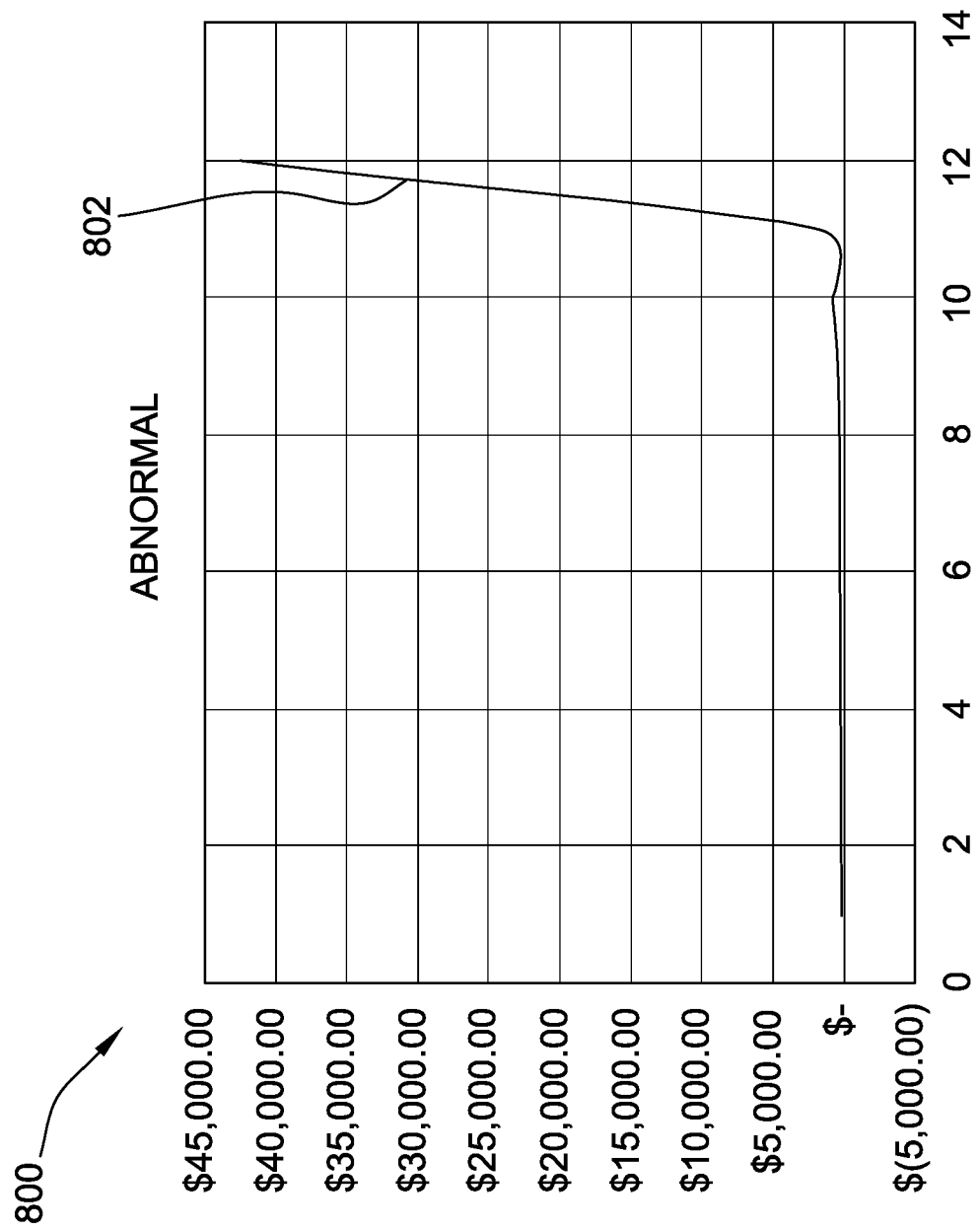

FIG. 7 is a graph 700 indicating normal transaction activity 702. However, in the event the percentage difference increases significantly or spikes, it is an indication of abnormal transaction activity, which may be an indication of macro level fraud. FIG. 8 is a graph 800 of the transaction data from Table 4. In the example embodiment, Table 4 and FIG. 8 show that there is a spike in transaction data 802 from $1,485.45 to $42,332.03, a percentage increase of 2750%. In addition, the subsequent bucket period increased an additional 560%. As such, transaction data 802 indicates abnormal transaction activity.

After the percentage differences of bucket periods are calculated, macro fraud detection module 34 may apply one or more filters to the transaction data to remove any velocities that are less than a determined minimum threshold. For example, in one embodiment, any issuer that has maximum velocities in a particular bucket period less than, for example, $10,000, will simply have one or more default thresholds applied. Analysis had shown that an issuer that falls under this level of transaction processing for the previous 90 days, can be handled via default values.

Figure 9:
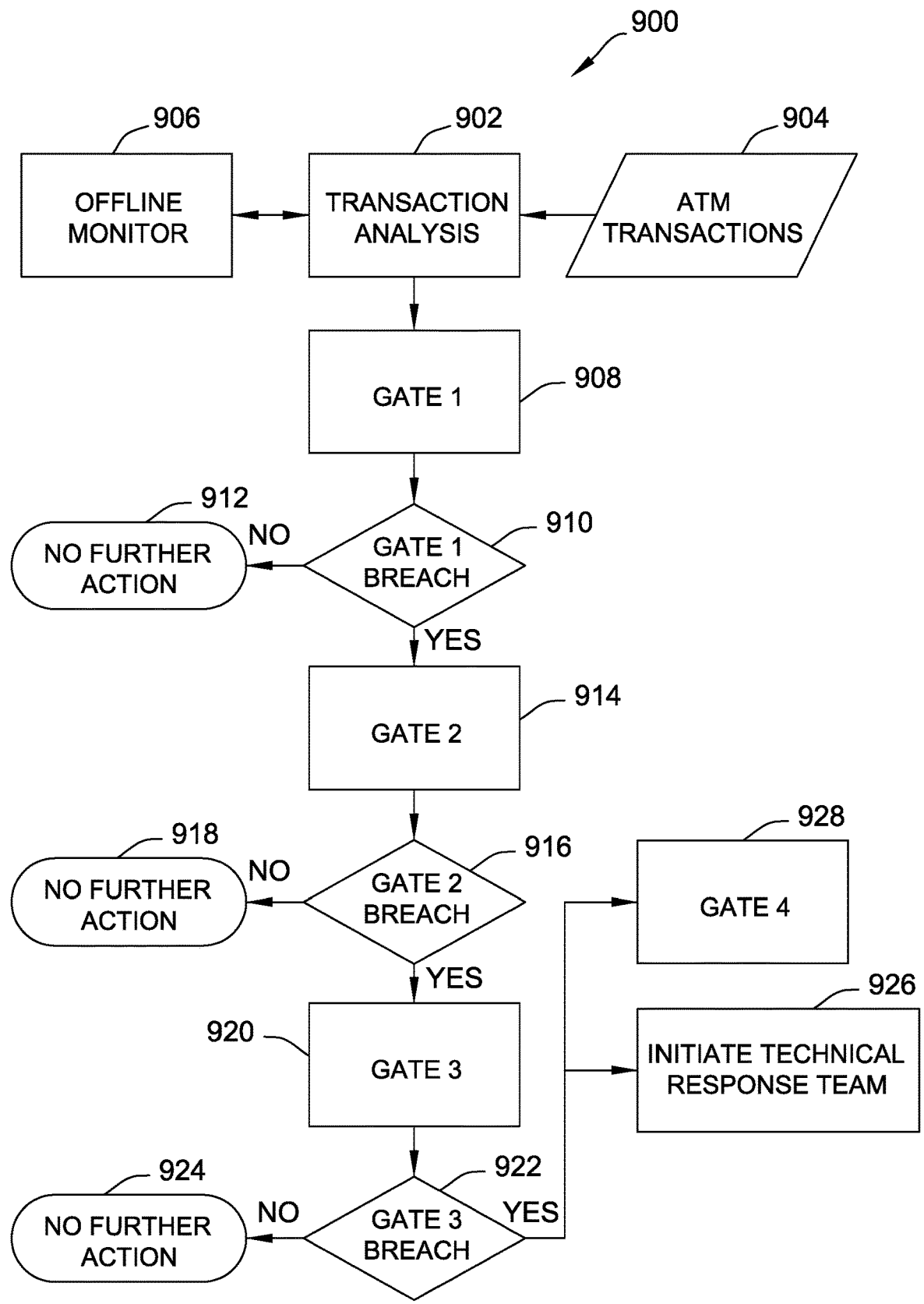

FIG. 9 is a block diagram showing the process flow 900 for detecting macro level fraud of transaction card ATM withdrawals in a specific country and for a specific issuer, such as issuer 30 (shown in FIG. 1) using macro fraud detection module 34 (shown in FIG. 1). In the example embodiment, macro fraud detection module 34 is programmed to perform a transaction analysis 902 of ATM transactions 904. In one embodiment, macro fraud detection module 34 processes transaction card transactions in real-time. In the example embodiment, macro fraud detection module 34 receives the transaction data, such as transaction data 514 (shown in FIG. 5), from an ATM, for example, ATM 24 (shown in FIG. 1), and/or server system 112. An offline monitoring component 906 monitors the process flow 900 for gate breaches, as described herein.

As the transaction card transactions are processing, for example, in real-time, through interchange network 28 (shown in FIG. 1), such as the Mastercard® interchange network, macro fraud detection module 34 aggregates the transaction data by issuer and country in a thirty minute rolling velocity. The rolling velocity is evaluated against what was deemed "normal" from the offline data analytics described above, and is compared to a predetermined base threshold based on, for example, and without limitation, a maximum velocity for the transaction data period, a full years' transaction data, a particular months' transaction data, and/or a maximum velocity for a particular bucket period. It is noted that the threshold value can be based on any period from the transaction data that enables macro fraud detection module 34 to function as described herein. This is considered Gate 1 and is indicated at block 908. Table 5 is a table of a set of example tiered threshold values, including a base threshold and a maximum threshold for a series of tiers, generated using aggregated historical transaction data, as described herein. The basic tiers, for example, are associated with the velocities of the transaction data for each of a plurality of bucket periods. Thus, if a particular velocity, as described above, is approximately $33,000 for a particular bucket period, that bucket period would be assigned a base threshold of $90,000 and a maximum threshold of $120,000. Tiered thresholds are used in process flow 900 because the transaction volumes for an issuer typically fluctuate, for example, as the issuer increase its business and/or customer base, as certain geographical events and/or holidays occur, etc.

TABLE 5

| Tier | Tier Start | Tier End | Tier % | Base Threshold | Maximum Threshold |
|------|------------|----------|--------|----------------|-------------------|
| 1 | $ 10,000.00 | $ 20,000.00 | 400 | $ 50,000.00 | $100,000.00 |
| 2 | $ 20,000.00 | $ 30,000.00 | 300 | $ 80,000.00 | $120,000.00 |
| 3 | $ 30,000.00 | $ 40,000.00 | 200 | $ 90,000.00 | $120,000.00 |
| 4 | $ 40,000.00 | $ 50,000.00 | 100 | $ 80,000.00 | $100,000.00 |
| 5 | $ 50,000.00 | $100,000.00 | 90 | $ 95,000.00 | $190,000.00 |
| 6 | $100,000.00 | $200,000.00 | 80 | $180,000.00 | $360,000.00 |
| 7 | $200,000.00 | $300,000.00 | 70 | $340,000.00 | $510,000.00 |
| 8 | $300,000.00 | $400,000.00 | 60 | $480,000.00 | $640,000.00 |
| 9 | $400,000.00 | $500,000.00 | 50 | $600,000.00 | $750,000.00 |

In one embodiment, the tiered thresholds are determined on a percentage basis, where the percentage value varies by tier. For example, tier 1 above has a range from $10,000 to $20,000. The base and maximum threshold values are set to be an additional 400% over the tier values. This percentage decreases as the tier values increase. The varying percentage values facilitate accommodating larger valid transactions that may occur for smaller issuers. Large transactions by account holders of small issuers could be inadvertently flagged as possible fraud because the purchases would make up a larger percentage of the tier, and therefore result in a larger percentage change in the velocity. As one example, for an small issuer that averages velocities of about $10,000, a single $3,000 purchase (e.g., a valid withdrawal for purchase of a television or other item(s)) represents 30% of the average velocity and therefore could easily result in a flag or alert. Accordingly, the percentages for such small-velocity tiers are higher to accommodate such variations.

A determination 910 is made as to whether Gate 1 is breached. If Gate 1 is not breached, i.e., if the real-time velocity is less than the base threshold associated with the particular bucket period, then no further action is required, as indicated at block 912. However, if Gate 1 is breached, the process flow 900 continues to Gate 2 indicated by block 914, where the velocity is evaluated against the predetermined maximum threshold associated with the particular bucket period.

A determination 916 is made as to whether Gate 2 is breached. If Gate 2 is not breached, i.e., if the real-time velocity is less than the maximum threshold associated with the particular bucket period, then no further action is required, as indicated at block 918. However, if Gate 2 is breached, the process flow 900 continues to Gate 3 indicated by block 920, where the number of unique PANs in each bucket is analyzed. As described above, the number of unique PANs may be used to facilitate enhancing the fraud risk management (FRM) rules. For example, as Gate 2 is breached, process flow 900 evaluates how many PANs are transacting within the particular country. Historically, ATM fraud has included the use of a high number of PANs in a short period of time and in a particular country, where the country is typically cross border to the issuer. As such, macro fraud detection module 34 may compare the number of unique PANs to the number of unique PANs determined from the historical transaction data, as described above, to determine 922 whether Gate 3 is breached. If the number of PANs is below a predetermined threshold, then no further action is required, as indicated at block 924. When the number of transacting PANs exceeds the predetermined threshold, Gate 3 is considered breached and process flow 900 continues to process block 926 and Gate 4, indicated by block 928. In the example embodiment, process block 926 and Gate 4 are implemented simultaneously, although in some embodiments, the process flow can flow to one or the other in a sequential manner.

In the example embodiment, at process block 926, macro fraud detection module 34 automatically generates an alert, such as, for example, a fraud detected message to a technical response team (TRT). Based on the alert, the TRT begins a manual investigation into the transactions flagged by the macro fraud detection module 34 as determined to have breached Gates 1-3. The TRT evaluates the transaction data to further assess the situation and to determine if the transactions are genuine fraud. In some embodiments, the TRT contacts the issuer regarding the transactions. The TRT and/or the issuer then determines whether the transactions are genuine or if further steps need to be taken to limit the issuer's exposure, such as blocking all further transactions by the transaction cards identified and/or all transactions from the issuer's cards in that country.

At Gate 4, macro fraud detection module 34 begins throttling the allowed transactions for the transaction cards that are identified as part of the macro level fraud activity. In one embodiment, macro fraud detection module 34 may only allow a pre-determined limit of transactions. For example, and without limitation, macro fraud detection module 34 may set a limit of $105 per hour, per transaction card associated with the issuer in the identified country. The limit would still allow a single withdrawal if an account holder needs to withdraw cash; however, it is effective at reducing the potential macro level fraud while the TRT investigates the incident further, as described above.

Figure 10:
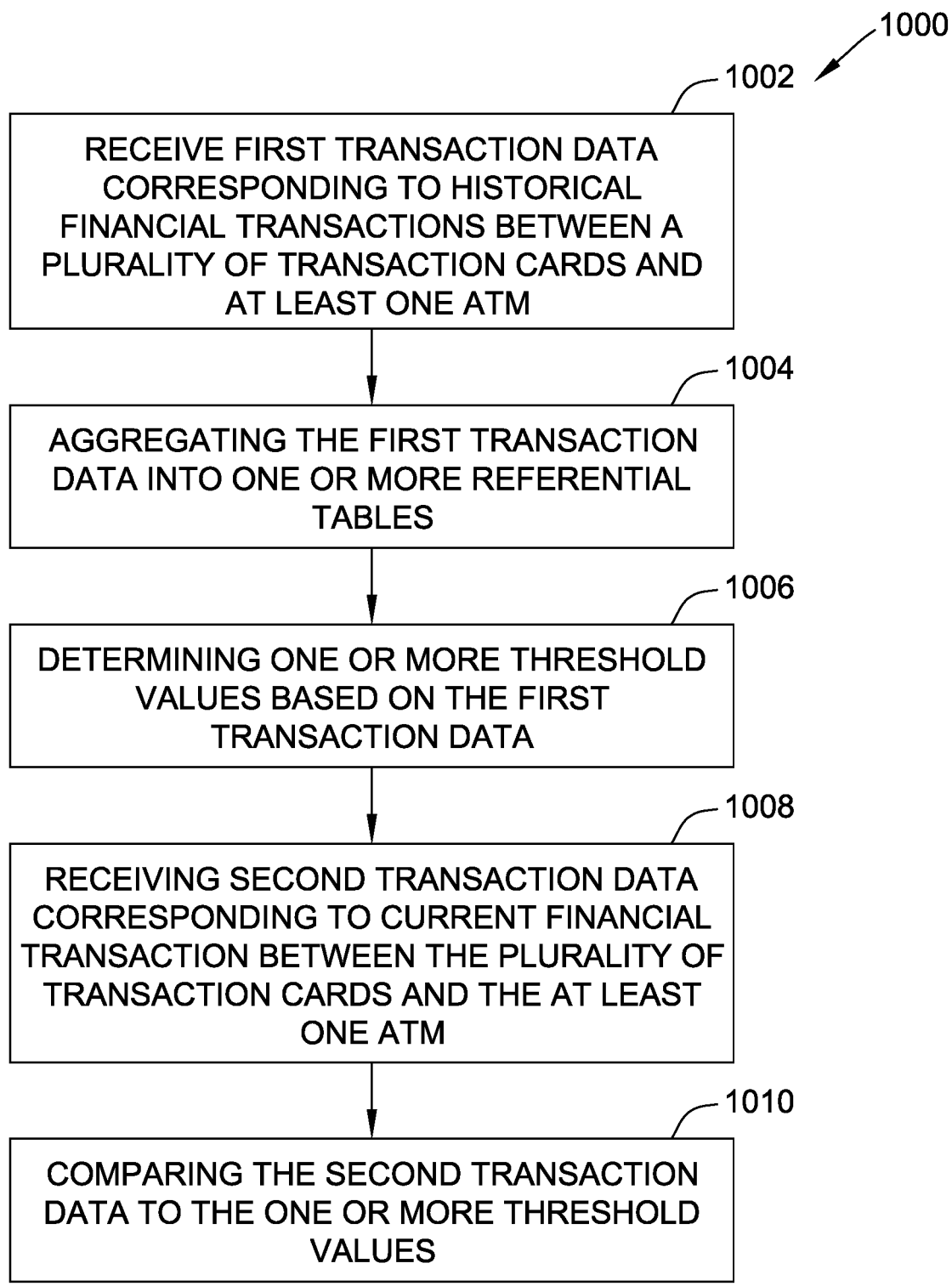

FIG. 10 is flow chart of an example method 1000 for detecting macro level fraud of a plurality of transaction cards using a computer device coupled to a memory device. In the example embodiment, method 1000 is implemented by macro fraud detection module 34 (shown in FIG. 1). Method 1000 is a computer-based method for detecting macro level fraud of transaction card transactions based on the transaction card issuer's historical transaction history in a particular country over a predetermined period, i.e., detecting fraudulent transactions with a plurality of transaction cards based on the transactions being outside the historical transaction pattern of the issuer's cardholders. The method is implemented using a macro fraud detection module or computer device coupled to a memory device. The macro fraud detection module is communicatively coupled to an interchange network, for example, through a network. Additionally, a data analytics processor, which may be a separate data structure stored on a separate data storage and retrieval device, is also communicatively coupled to the interchange network through the network or through a private network, such as, but not limited to a LAN.

In the example embodiment, the method includes receiving 1002 historical financial transaction data corresponding to a plurality of historical financial transactions between a plurality of transaction cards and a plurality of ATMs. In one embodiment, the financial transaction data is received by the macro fraud detection module from the interchange network over the network. In other embodiments, the data analytics processor receives the financial transaction data directly from the interchange network. The input transaction data used by the macro fraud detection module, such as macro fraud detection module 34, includes at least the most recent three months of transaction data, plus the upcoming month's transaction data from the previous year. In other embodiments, the input transaction data includes at least a complete year's worth of transaction data.

The method 1000 also includes aggregating 1004 the historical financial transaction data into one or more referential tables. In particular, the macro fraud detection module aggregates the historical financial transaction data into referential tables by issuer, country of transaction, and channel. In one embodiment, the data in each referential table is sorted into thirty minute buckets per date of the transactions. For example, the macro fraud detection module sorts the data by date and time, and calculates the total transaction amount for each thirty minute bucket to determine the velocity associated with the financial transactions during the particular bucket period.

The macro fraud detection module aggregates the financial transaction data into one or more additional referential tables based on the largest determined velocity for a particular bucket period. The one or more additional referential tables are sorted from smallest velocity to largest velocity. In one embodiment, the macro fraud detection module determines the percentage difference between consecutive buckets of the sorted maximum velocities.

The method 1000 includes determining 1006 one or more threshold values based on the historical financial transaction data and the determined velocities. In one embodiment, the macro fraud detection module may apply one or more filters to the transaction data to remove any velocities that are less than a determined minimum threshold. In other embodiments, the macro fraud detection module determines at least one base threshold based on, for example, and without limitation, a maximum velocity for the transaction data period, a full year's transaction data, a particular month's transaction data, and/or a maximum velocity for a particular bucket period. In addition, the macro fraud detection module determines at least one maximum threshold. The tiered thresholds are used because the transaction volumes for an issuer may fluctuate, for example, as the issuer increase its business and/or customer base, as certain geographical events and/or holidays occur, etc.

The method 1000 further includes receiving 1008 current financial transaction data corresponding to a plurality of current financial transactions between a plurality of transaction cards and a plurality of ATMs. For example, in one embodiment, the macro fraud detection module receives real-time financial transaction data. The macro fraud detection module aggregates the current financial transaction data by issuer and country and determines a thirty minute rolling velocity for the current financial transaction data.

The method 1000 includes comparing 1010 the current financial transaction data to the one or more threshold values. In particular, the thirty minute rolling velocity is evaluated and compared to the predetermined base threshold; this is considered Gate 1. If Gate 1 is breached, the current financial transaction data is evaluated against the predetermined maximum threshold associated with the particular bucket period; this is considered Gate 2. The macro fraud detection module determines whether Gate 2 is breached, and if so, the number of unique PANs transacting in each bucket is analyzed and compared against a predetermined threshold; this is considered Gate 3.

In one embodiment, if Gate 3 is breached, the macro fraud detection module automatically generates an alert to a technical response team (TRT). Based on the alert, the TRT begins a manual investigation into the current financial transactions. Furthermore, the macro fraud detection module begins throttling the allowed transactions for the transaction cards that are identified as part of the macro level fraud activity. In one embodiment, the macro fraud detection module may only allow a pre-determined limit of transactions.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

The technical effects of the systems and methods described herein are achieved by performing at least one of the following steps: (a) receiving, by the macro fraud detection module, historical financial transaction data corresponding to a plurality of historical financial transactions between a plurality of transaction cards and a plurality of ATMs; (b) aggregating the historical financial transaction data into one or more referential tables; (c) determining one or more threshold values based on the historical financial transaction data and the determined velocities; (d) receiving, by the macro fraud detection module, current financial transaction data corresponding to a plurality of current financial transactions between a plurality of transaction cards and a plurality of ATMs; and (e) comparing the current financial transaction data to the one or more threshold values.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A macro fraud detection system for detecting macro level fraud of transaction card automated teller machine (ATM) withdrawals occurring across multiple transactions at one or more ATMs, said macro fraud detection system comprising:

a memory device for storing data; and a processor communicatively coupled to said memory device, said processor programmed to:

receive first transaction data corresponding to historical financial transactions initiated between a plurality of transaction cards and at least one ATM within a period of time;

aggregate the first transaction data into one or more referential tables by:

sorting the first transaction data into thirty-minute intervals of time per transaction date and calculating a total transaction velocity for each thirty-minute interval; and calculating a total transaction velocity for each thirty minute interval of time;

generate, using the aggregated first transaction data, one or more threshold values for application to subsequent transactions involving the plurality of transaction cards and the at least one ATM, the one or more threshold values representing normal transaction behavior, including a normal transaction velocity and a largest transaction velocity, between the plurality of transaction cards and the at least one ATM over any thirty-minute interval of time within the period of time;

receive, in real-time, second transaction data corresponding to current, real-time financial transactions between the plurality of transaction cards and the at least one ATM;

compare a rolling velocity of the second transaction data over thirty-minute intervals of time to the one or more threshold values for a corresponding thirty-minute interval of time to detect whether real-time transaction behavior between the plurality of transaction cards and the at least one ATM is abnormal, representing higher likelihood that macro-level fraud occurring across multiple transactions between the plurality of transaction cards and the at least one ATM is occurring at the at least one ATM; and when abnormal real-time transaction behavior is detected based upon on the comparison, limit the current, real-time financial transactions between the plurality of transaction cards and the at least one ATM including causing the at least one ATM to decline, in real-time, at least a subset of the current, real-time financial transactions between the plurality of transaction cards and the least one ATM.

2. The macro fraud detection system in accordance with claim 1, wherein said processor is further programmed to aggregate the first transaction data into the one or more referential tables by at least one of issuer, country of transaction, and channel.

3. The macro fraud detection system in accordance with claim 1, wherein said processor is further programmed to aggregate the first transaction data into one or more additional second referential tables based on a largest determined velocity for each respective thirty minute interval of time.

4. The macro fraud detection system in accordance with claim 3, wherein said processor is further programmed to:
sort the one or more additional second referential tables from smallest velocity to the largest determined velocity for each respective thirty minute interval of time; and
determine a percentage difference between consecutive velocities of the sorted one or more additional second referential tables.

5. The macro fraud detection system in accordance with claim 3, wherein said processor is further programmed to determine the one or more threshold values based on the first transaction data and the largest determined velocity of the first transaction data.

6. The macro fraud detection system in accordance with claim 1, wherein determining the one or more threshold values comprises determining at least one base threshold value and at least one maximum threshold value based on at least one velocity of the thirty minute intervals of time.

7. The macro fraud detection system in accordance with claim 6, wherein the at least one base threshold value is based on one of a maximum velocity for a transaction data period, at least a full year's transaction data, a particular month's transaction data, and a maximum velocity for one of the thirty minute intervals of time.

8. The macro fraud detection system in accordance with claim 1, wherein said processor is further programmed to:
aggregate the second transaction data by issuer and country; and
determine a thirty minute rolling velocity for the second transaction data for comparison to the one or more threshold values.

9. A computer-based method for detecting macro level fraud of transaction card automated teller machine (ATM) withdrawals occurring across multiple transactions at one or more ATMs, said method comprising:
receiving first transaction data corresponding to historical financial transactions initiated between a plurality of transaction cards and at least one ATM within a period of time;
aggregating the first transaction data into one or more referential tables by:
sorting the first transaction data into thirty-minute intervals of time per transaction date and calculating a total transaction velocity for each thirty-minute interval; and
calculating a total transaction velocity for each thirty minute interval of time;
generating, using the aggregated first transaction data, one or more threshold values for application to subsequent transactions involving the plurality of transaction cards and the at least one ATM, the one or more threshold values representing normal transaction behavior, including a normal transaction velocity and a largest transaction velocity, between the plurality of transaction cards and the at least one ATM over any thirty-minute interval of time within the period of time;
receiving, in real-time, second transaction data corresponding to current, real-time financial transactions between the plurality of transaction cards and the at least one ATM;
comparing a rolling velocity of the second transaction data over thirty-minute intervals of time to the one or more threshold values for a corresponding thirty-minute interval of time to detect whether real-time transaction behavior between the plurality of transaction cards and the at least one ATM is abnormal, representing higher likelihood that macro-level fraud occurring across multiple transactions between the plurality of transaction cards and the at least one ATM is occurring at the at least one ATM; and
when abnormal real-time transaction behavior is detected based upon on the comparison, limiting the current, real-time financial transactions between the plurality of transaction cards and the at least one ATM, said limiting comprising causing the at least one ATM to decline, in real-time, at least a subset of the current, real-time financial transactions between the plurality of transaction cards and the least one ATM.

10. The method in accordance with claim 9, wherein determining the one or more threshold values comprises determining at least one base threshold value and at least one maximum threshold value based on the first transaction data.

11. The method in accordance with claim 10, wherein comparing the second transaction data to the one or more threshold values comprises:
determining the thirty minute rolling velocity for the second transaction data; and
comparing the thirty minute rolling velocity to the at least one base threshold value.

12. The method in accordance with claim 11 further comprising, when the thirty minute rolling velocity exceeds the at least one base threshold value, comparing the thirty minute rolling velocity to the at least one maximum threshold value.

13. The method in accordance with claim 12 further comprising, when the thirty minute rolling velocity exceeds the at least one maximum threshold value:
determining a number of unique primary account numbers (PANs) in the second transaction data; and
comparing the number of unique PANs to a predetermined threshold.

14. The method in accordance with claim 13 further comprising, when the number of unique PANs exceeds the predetermined threshold, automatically generating an alert to a technical response team (TRT).

15. One or more non-transitory computer-readable storage media having computer-executable instructions embodied thereon, wherein when executed by at least one processor, the computer-executable instructions cause the processor to:

receive first transaction data corresponding to historical financial transactions initiated between a plurality of transaction cards and at least one ATM within a period of time;

aggregate the first transaction data into one or more referential tables by:
sorting the first transaction data into thirty-minute intervals of time per transaction date and calculating a total transaction velocity for each thirty-minute interval; and
calculating a total transaction velocity for each thirty minute interval of time;

generate, using the aggregated first transaction data, one or more threshold values for application to subsequent transactions involving the plurality of transaction cards and the at least one ATM, the one or more threshold values representing normal transaction behavior, including a normal transaction velocity and a largest transaction velocity, between the plurality of transaction cards and the at least one ATM over any thirty-minute interval of time within the period of time;

receive, in real-time, second transaction data corresponding to current, real-time financial transactions between the plurality of transaction cards and the at least one ATM;

compare a rolling velocity of the second transaction data over thirty-minute intervals of time to the one or more threshold values for a corresponding thirty-minute interval of time to detect whether real-time transaction behavior between the plurality of transaction cards and the at least one ATM is abnormal, representing higher likelihood that macro-level fraud occurring across multiple transactions between the plurality of transaction cards and the at least one ATM is occurring at the at least one ATM; and when abnormal real-time transaction behavior is detected based upon on the comparison, limit the current, real-time financial transactions between the plurality of transaction cards and the at least one ATM including causing the at least one ATM to decline, in real-time, at least a subset of the current, real-time financial transactions between the plurality of transaction cards and the least one ATM.

16. The non-transitory computer-readable storage media in accordance with claim 15, wherein the computer-executable instructions further cause the processor to:

sort the first transaction data into thirty minute intervals of time per date based on a date of a respective transaction of the first transaction data; and calculate a total transaction amount for each thirty minute interval of time, wherein the total transaction amount is the normal transaction velocity of a respective thirty minute interval of time.

17. The non-transitory computer-readable storage media in accordance with claim 16, wherein the computer-executable instructions further cause the processor to:

aggregate the first transaction data into one or more additional second referential tables based on a largest determined velocity for each respective thirty minute interval of time;

sort the one or more additional second referential tables from smallest velocity to the largest determined velocity for each respective thirty minute interval of time; and determine a percentage difference between consecutive velocities of the sorted one or more additional second referential tables.

* * * * *